(12) United States Patent
Saucier et al.

(10) Patent No.: US 9,097,058 B2
(45) Date of Patent: Aug. 4, 2015

(54) BONDED-IN, ANTI-VANDALISM TRANSIT VEHICLE WINDOW SYSTEM

(75) Inventors: Stanton D. Saucier, Tarzana, CA (US); David C. Griffis, Round Lake, IL (US); Simon Evans, Hilton (GB)

(73) Assignee: Ricon Corp., Panorama City, CA (US)

( * ) Notice: Subject to any disclaimer, the term of this patent is extended or adjusted under 35 U.S.C. 154(b) by 35 days.

(21) Appl. No.: 13/577,685

(22) PCT Filed: Feb. 23, 2011

(86) PCT No.: PCT/US2011/025879
§ 371 (c)(1),
(2), (4) Date: Oct. 15, 2012

(87) PCT Pub. No.: WO2011/106390
PCT Pub. Date: Sep. 1, 2011

(65) Prior Publication Data
US 2013/0205673 A1    Aug. 15, 2013

Related U.S. Application Data

(60) Provisional application No. 61/307,708, filed on Feb. 24, 2010.

(51) Int. Cl.
*E06B 5/10* (2006.01)
*B60J 1/00* (2006.01)
*B60J 1/20* (2006.01)

(52) U.S. Cl.
CPC . *E06B 5/10* (2013.01); *B60J 1/006* (2013.01); *B60J 1/2094* (2013.01)

(58) Field of Classification Search
CPC .............. B60J 1/006; B60J 1/007; B60J 1/10; B60J 1/2094; E06B 5/10
USPC ........................ 296/190.1, 201, 146.15, 96.21
See application file for complete search history.

(56) References Cited

U.S. PATENT DOCUMENTS

| | | | |
|---|---|---|---|
| 4,042,004 A | | 8/1977 | Kwan |
| 4,295,306 A | * | 10/1981 | Garman ........................ 52/208 |
| 4,627,201 A | * | 12/1986 | Hamamoto et al. ............ 52/208 |
| 4,758,039 A | * | 7/1988 | Ohhazama et al. ........ 296/96.21 |
| 5,062,248 A | | 11/1991 | Kunert |
| 5,893,600 A | * | 4/1999 | McManus ................ 296/146.16 |
| 6,205,723 B1 | | 3/2001 | Farrar et al. |
| 6,408,574 B1 | | 6/2002 | Farrar et al. |
| 6,412,225 B1 | | 7/2002 | McManus |
| 6,425,215 B2 | | 7/2002 | Farrar |
| 6,581,342 B1 | | 6/2003 | Tavivian |
| 6,688,044 B2 | | 2/2004 | Farrar et al. |
| 6,869,128 B2 | | 3/2005 | Farrar et al. |
| 6,871,902 B2 | | 3/2005 | Carson et al. |
| 7,021,006 B2 | | 4/2006 | Farrar et al. |
| 7,080,874 B2 | | 7/2006 | Farrar et al. |
| 7,082,736 B2 | | 8/2006 | Farrar et al. |
| 7,152,906 B1 | | 12/2006 | Farrar et al. |
| 7,254,927 B1 | | 8/2007 | Farrar et al. |
| 7,568,316 B2 | | 8/2009 | Choby et al. |
| 2004/0145214 A1 | * | 7/2004 | Farrar et al. ............. 296/146.15 |

* cited by examiner

*Primary Examiner* — Jason S Morrow
(74) *Attorney, Agent, or Firm* — The Webb Law Firm

(57) ABSTRACT

A window system for a vehicle includes a glazing assembly, a frame member having a portion for receiving the glazing assembly, and a mounting clip having a body and an extension that extends outwardly from the body of the mounting clip. The body of the mounting clip is configured to be attached to a body portion of a vehicle and the extension is configured to be attached to the frame member.

25 Claims, 7 Drawing Sheets

BONDED-IN, ANTI-VANDALISM TRANSIT VEHICLE WINDOW SYSTEM

CROSS REFERENCE TO RELATED APPLICATIONS

This application claims the benefit of U.S. Provisional Application No. 61/307,708, filed Feb. 24, 2010, the entire content of which is hereby incorporated by reference.

BACKGROUND OF THE INVENTION

1. Field of the Invention

The present invention relates to transit vehicle window systems and, more particularly, to window systems intended for use in urban transit vehicles subject to vandalism and graffiti.

2. Description of Related Art

Window systems for transit vehicles used in urban areas typically include an exterior window glazing that can be readily replaced and a sacrificial layer or shield positioned on the inside of the vehicle to allow the glazing or sacrificial layer to be replaced in the event of vandalism or graffiti. For instance, scratch type graffiti can be mitigated simply by replacing the sacrificial layer. Further, if the window glazing is broken, the glazing can be replaced quickly resulting in significant reductions in vehicle downtime.

Referring to FIG. 1, in the North American market, windows 2 are generally affixed to the vehicle using a clamping ring 4 and a series of mechanical fasteners. The vehicle structure 6 is sandwiched or compressed between a main frame 8 of the window 2 and the clamping ring 4. The vehicle structure 6 and the window 2 define an outside 10 and an inside 12 of the vehicle.

In other markets outside of North America, such as Europe, the United Kingdom and Australia, operators are faced with similar graffiti and vandalism issues. However, in these markets, the method and arrangements of urban transit vehicle manufacturing is somewhat different. Referring to FIG. 2, these markets typically utilize what is referred to as "bonded glazing" 14, which directly bonds the vehicle glazing 16 to the vehicle structure 18 via a vehicle glazing adhesive 20. The interior is typically finished using interior vehicle trim 22.

In the interest of ensuring a relatively quick turn-around of transit vehicles that have had windows broken, the primary contract transportation providers for cities may specify that rubber gasket glazed window arrangements are to be used. Although the rubber gasket glazed window arrangements feature a more rapid turn-around time than the bonded glass counterpart, the exterior aesthetic of the vehicle is less appealing. With regard to interior window surface graffiti, an adhesive backed, biaxially-oriented polyethylene terephthalate (boPET) polyester film (sold commercially under the name MYLAR and equivalent products) is commonly used to protect the interior of the window. The boPET polyester film is used in single sheet applications as well as "tear-away", multi-sheet applications. The boPET polyester film can be replaced when subjected to graffiti or vandalism rather than replacing the glass. The application of the boPET polyester an, however, is a specialized skill acquired over time. The film is difficult for a novice to apply without wrinkles or trapped air bubbles. The combination of the specialized skill in applying and the material cost of the film can result in high maintenance costs.

U.S. Pat. Nos. 7,152,906; 7,080,874; and 6,869,128 ("Farrar et al., quick change window assembly patents") generally disclose quick change window assemblies allowing for the easy removal and replacement of window glazing from the window opening in the sidewall of the vehicle and are hereby incorporated by reference in their entirety.

U.S. Pat. Nos. 6,205,723; 6,408,574; 6,425,215; 6,688,044; 6,871,902; 7,021,006; 7,082,736; and 7,254,927 ("Farrar et al., quick release sacrificial shield patents") generally disclose quick release sacrificial shield arrangements for window assemblies and are hereby incorporated by reference in their entirety.

SUMMARY OF THE INVENTION

In one embodiment, a window system for a vehicle includes a glazing assembly, a frame member having a portion for receiving the glazing assembly, and a mounting clip having a body and an extension that extends outwardly from the body of the mounting clip. The body of the mounting clip is configured to be attached to a body portion of a vehicle and the extension is configured to be attached to the frame member.

The portion for receiving the glazing assembly of the frame member may include a gasket seat and a clip receiving portion. The glazing assembly may include a glass retaining clip, a wedge, a sacrificial liner, window glazing, and a glazing gasket. The glazing gasket is configured to be received by the gasket seat, and the glass retaining clip is configured to be received by the clip receiving portion. The gasket seat and the clip receiving portion may be positioned adjacent to each other with the sacrificial liner and the window glazing configured to be positioned between the wedge and the glazing gasket. The frame member may include a trim receiving portion.

The portion for receiving the glazing assembly of the frame member may include a retaining lip with the glazing assembly including a glass ring, window glazing, a glazing clip, and a sacrificial liner. The glass ring may have a retaining lip, and the glass ring may be secured to the window glazing such that the glazing clip is configured to engage the retaining lip of the frame member and the retaining lip of the glass ring. The glazing clip may have a portion for receiving the sacrificial liner. The extension of the mounting clip may define an opening for receiving a fastener. The mounting clip may further include a pair of legs extending from the body on a side opposite from the extension. The pair of legs of the mounting clip may include detents configured to engage the body portion of the vehicle, and the extension of the mounting clip may define a slot-shaped opening for receiving a fastener.

In another embodiment, a window system for a vehicle includes a window frame defined by a body portion of a vehicle, a frame member positioned adjacent to the window frame, a glazing assembly secured to a portion of the frame member, and a mounting clip having a body and an extension. The body of the mounting clip is secured to the window frame and the extension of the mounting clip is secured to the frame member.

The frame member may be secured to the window frame by a bonding agent. The window system may further include a trim member having a first end secured to the frame member and a second end secured to the body portion of the vehicle with the trim member configured to conceal the mounting clip. The frame member may include a retaining lip for securing the glazing assembly with the glazing assembly including a glass ring, window glazing, a glazing clip, and a sacrificial liner. The glass ring may have a retaining lip with the glass ring secured to the window glazing and the glazing clip engaging the retaining lip of the frame member and the retaining lip of the glass ring. A bonding material may be positioned between the retaining lip of the frame member and the retaining lip of the glass ring. The glazing clip may receive the sacrificial liner. The window system may include a trim member having a first end secured to the glazing clip and a second end secured to the body portion of the vehicle with the trim member configured to conceal the mounting clip.

In a further embodiment, a window system for a vehicle includes a generally z-shaped frame having a first portion configured to be secured to a body portion of a vehicle and a second portion having a retaining lip, window glazing, a glass ring secured to the window glazing and having a retaining lip, and a glazing clip configured to engage the retaining lip of the frame and the retaining lip of the glass ring. The glazing clip may include a portion for receiving a sacrificial liner and a portion for receiving a trim member.

In yet another embodiment, a method of installing a window system includes securing a mounting clip to a window frame defined by a body portion of a vehicle, positioning a frame member adjacent to the window frame and securing the frame member to the mounting clip, and securing a glazing assembly to the frame member. The method may further include securing the frame member to the body portion of the vehicle using a bonding agent and installing a trim member to conceal the mounting clip.

Figure 1:
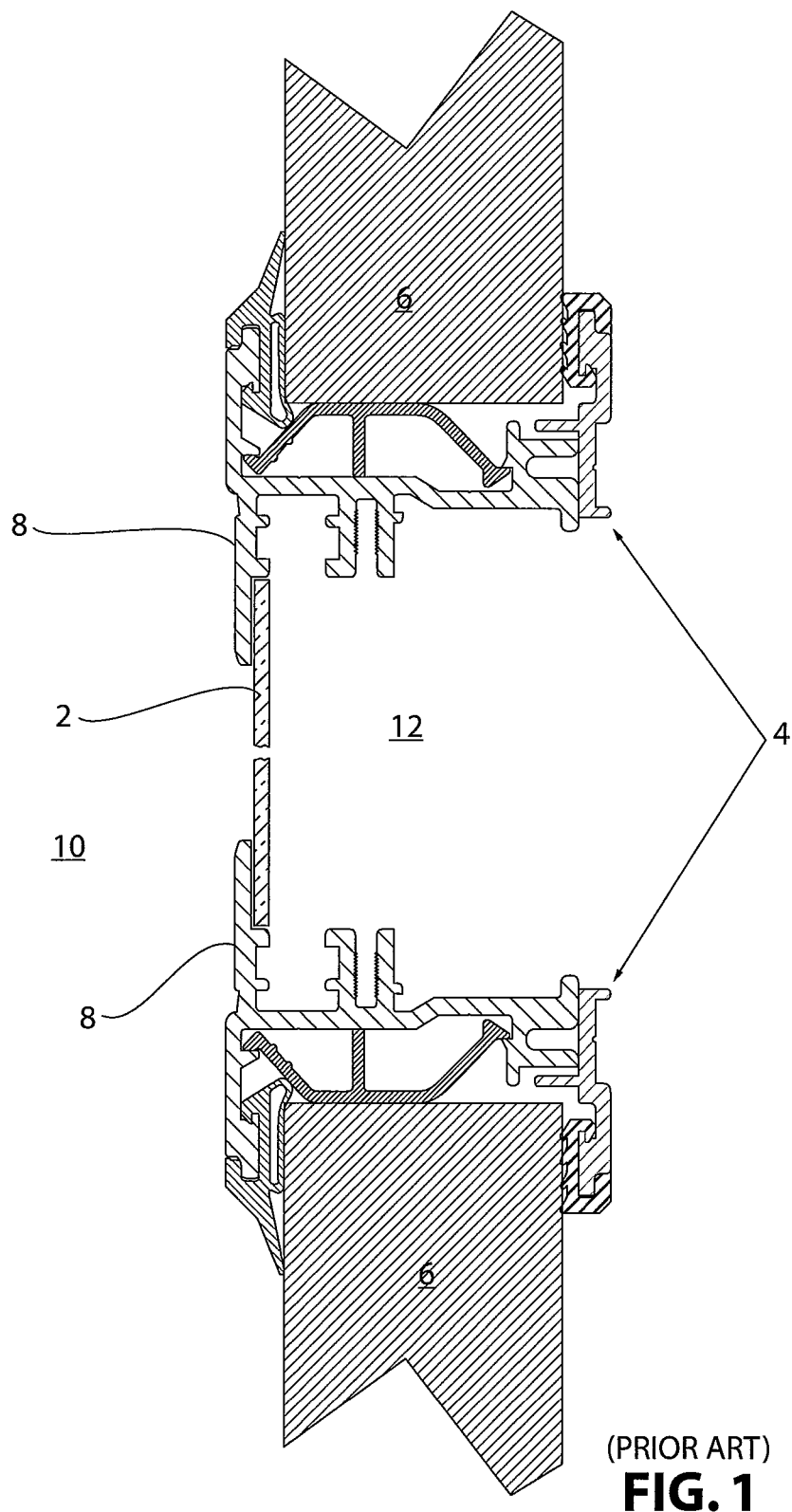
FIG. 1 is a top view of a conventional clamping-type vehicle window system.
Figure 2:
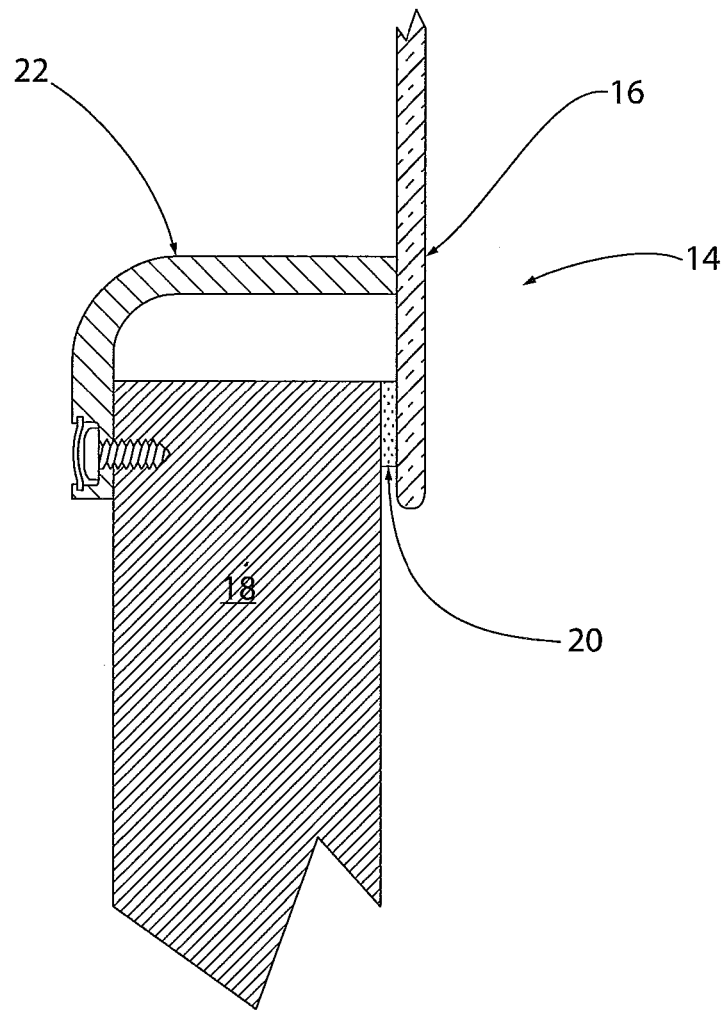
FIG. 2 is a cross-sectional view of a conventional bonded glazing-type vehicle window system.

DESCRIPTION OF THE PREFERRED
EMBODIMENT(S)

The present invention will now be described with reference to the accompanying figures. For purposes of the description hereinafter, the terms "upper", "lower", "right", "left", "vertical", "horizontal", "top", "bottom" and derivatives thereof shall relate to the invention as it is oriented in the drawing figures. However, it is to be understood that the invention may assume various alternative variations and step sequences, except where expressly specified to the contrary. It is to be understood that the specific apparatus illustrated in the attached figures and described in the following specification is simply an exemplary embodiment of the present invention. Hence, specific dimensions and other physical characteristics related to the embodiments disclosed herein are not to be considered as limiting.

Figures 3A, 3B:
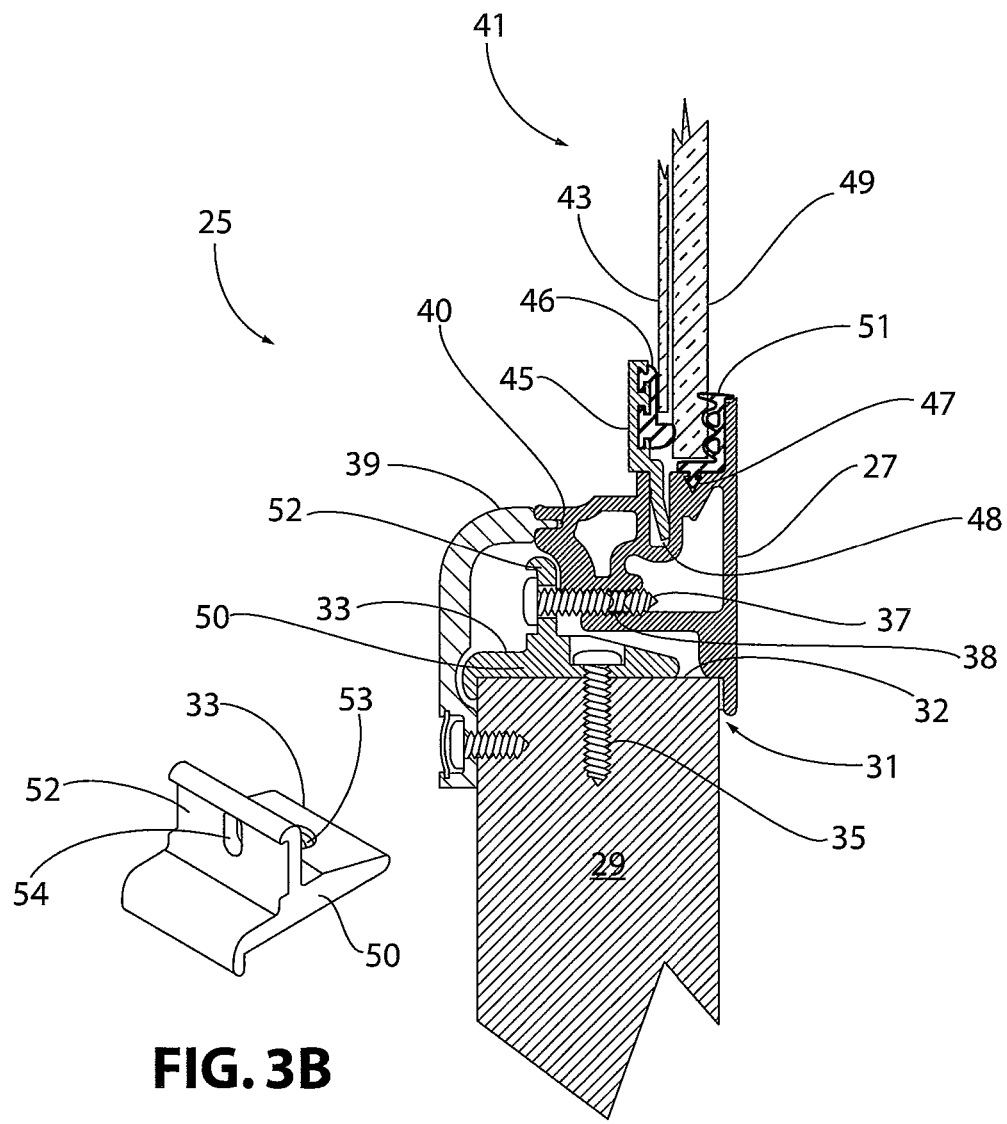
FIG. 3A is a cross-sectional view of a vehicle window system according to one embodiment of the present invention.
FIG. 3B is a perspective view of a mounting clip of the window system shown in FIG. 3A.

Referring to FIGS. 3A and 3B, one embodiment of a window system 25 includes a frame member 27 serving as the primary structure of the window system 25. A window frame 32 is defined by a body portion 29 for receiving the window system 25. The frame member 27 is positioned adjacent to the window frame 32 and is attached to the body portion 29 of the vehicle using a commercially available bonding agent 31. A plurality of mounting clips 33 are secured to the body portion 29 with a commercially available adhesive strip, or other fastening arrangements, such as screws 35. The mounting clips 33 retain the frame member 27 in the window frame 32 via a fastener 37, such as a screw, while the primary bonding agent 31 cures. The fastener 37 is received by an opening 38 in the frame member 27. The opening 38 extends in a direction perpendicular to a longitudinal length of the frame member 27. An interior trim member 39, such as is routinely used in the vehicle body building trade, may be used to conceal the mounting clips 33 and provide the vehicle with an aesthetically appealing interior. The interior trim member 39 engages a trim receiving portion 40 of the frame member 27 at one end and is secured to the body portion 29 at the other end.

Referring to FIG. 3A, the trim receiving portion 40 is a longitudinal groove defined by the frame member 27 that engages a portion of the interior trim member 39. The trim member 39 may be secured within the trim receiving portion 40 through frictional engagement, although other arrangements, such as locking detents or tabs, may also be utilized. The window system 25 further includes a glazing assembly 41 that is secured to the frame member 27. The glazing assembly 41 includes a sacrificial liner 43, a glass retaining clip 45, an elastomeric wedge 46, window glazing 49, and glazing gasket 51. The glazing assembly 41 may be similar to the Farrar et al. quick change window assembly patents and the Farrar et al. quick release sacrificial shield patents mentioned above. The frame member 27 includes a gasket seat 47 for receiving the glazing gasket 51 and a clip receiving portion 48 for receiving the glass retaining clip 45. The gasket seat 47 and the clip receiving portion 48 are longitudinal grooves defined by the frame member 27, although other suitable arrangements may be utilized. A portion of the sacrificial liner 43 and the window glazing 49 are positioned between the wedge 46 and the glazing gasket 51 thereby securing the liner 43 and glazing 49 to the frame member 27.

Referring to FIG. 3B, the mounting clip 33 includes a body 50 having an extension 52 that extends outwardly from the body 50 in a direction generally perpendicular to a plane defined by the body 50. The body 50 of the mounting clip 33 defines an opening 53 for receiving the fastener 35 that secures the clip 33 to the body portion 29 and the extension 52 defines an opening 54 for receiving the fastener 37 that secures the clip 33 to the frame member 27. The opening 54 is generally slot-shaped to allow adjustment between the frame member 27 and the clip 33. The window system 25 described above may include a plurality of mounting clips 33 positioned along the window frame 32 for receiving the frame member 27 that extends longitudinally along the length of the window frame 32.

Figures 4A, 4B:
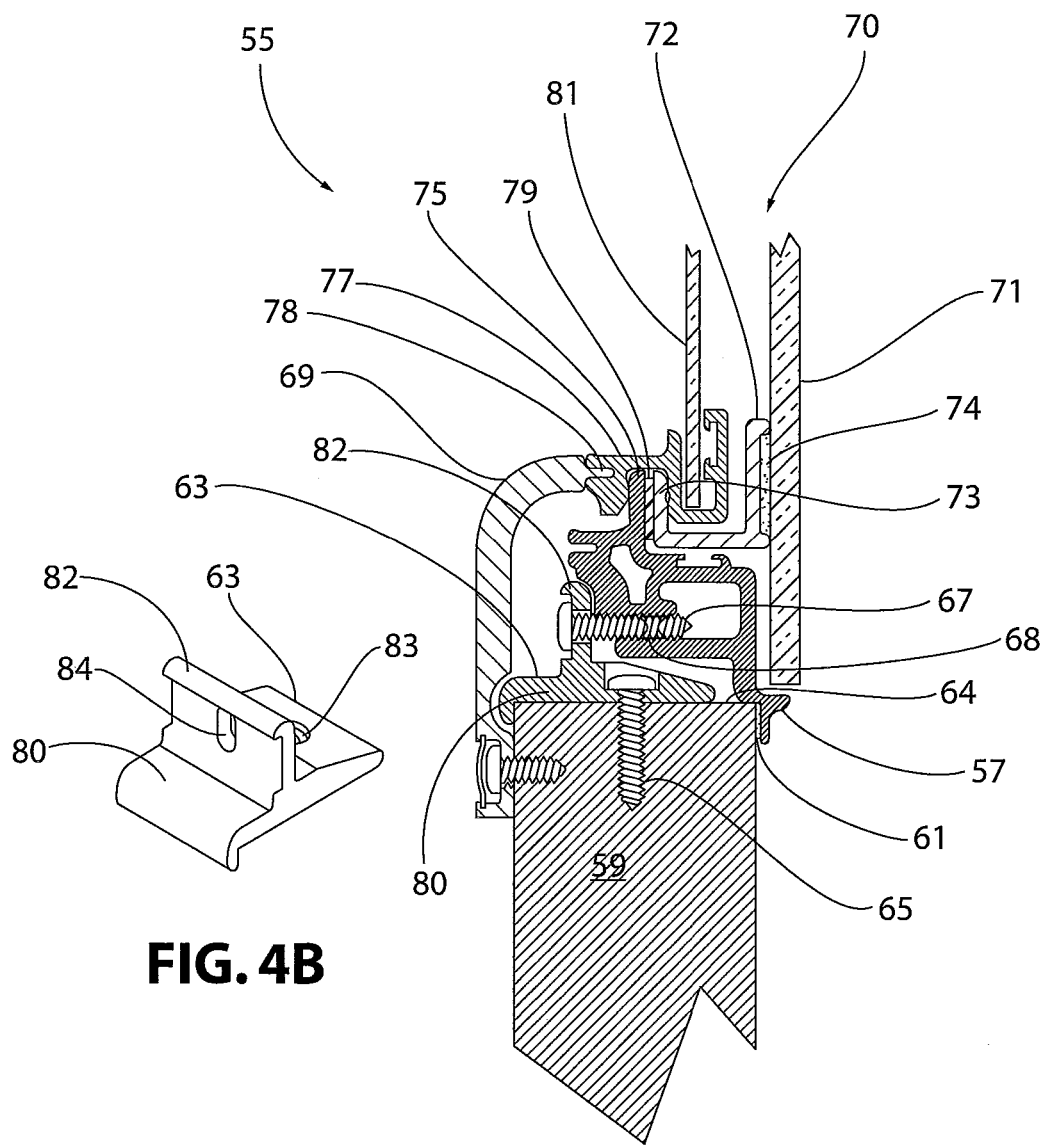
FIG. 4A is a cross-sectional view of a vehicle window system according to a further embodiment of the present invention.
FIG. 4B is a perspective view of a mounting clip of the window system shown in FIG. 4A.

Referring to FIGS. 4A and 4B, a further embodiment of a window system 55 includes a frame member 57 serving as the primary structure of the window system 55, which is attached to a body portion 59 of the vehicle using a commercially available bonding agent 61. A window frame 64 is defined by the body portion 59 for receiving the window system 55. Similar to the window system 25 shown in FIG. 3A, a plurality of mounting clips 63 are affixed to the body portion 59 with a commercially available adhesive strip, or other fastening arrangements, such as screws 65. The mounting clips 63 retain the frame member 57 in the window frame 64 via a fastener 67, such as a screw, while the primary bonding agent 61 cures. The fastener 67 is received by an opening 68 in the frame member 57. The opening 68 extends in a direction perpendicular to a longitudinal length of the frame member 57. An interior trim member 69, such as is routinely used in the vehicle body building trade, may be used to hide the mounting clips 63 and provide the vehicle with an aesthetically appealing interior.

Referring to FIG. 4A, the window system 55 includes a glazing assembly 70 having window glazing 71, a glass ring 72, a glazing clip 77, and a sacrificial liner 81. In order to achieve sleeker, smoother exterior lines of the vehicle, window glazing 71 is not retained in the frame member 57 by capturing the edges of the glass. Instead, the glass ring 72 is affixed to an inside surface of the glazing 71 via a commercially available adhesive 74 or any other suitable arrangement. The glass ring 72 is generally U-shaped in cross-section and includes a retaining lip 73. The glass ring 72 equipped window glazing 71 is then inserted into the frame member 57 such that the retaining lip 73 of the glass ring 72 is proximate to a retaining lip 75 of the frame member 57. The window glazing 71 is retained in the frame member 57 with a glazing clip 77 that holds the two retaining lips 73, 75 against each other.

Referring again to FIG. 4A, a contiguous piece of adhesive-backed foam tape 79 is affixed to one of the retaining lips 73, 75 to provide the dual purpose of sealing the interior of the vehicle from the exterior and providing the retaining pressure necessary to hold the combination of the two retaining lips 73, 75 and the glazing clip 77 together. The foam tape 79 functions similarly to the elastomeric wedge 46 of the window system 25 shown in FIG. 3A. Instead of the foam tape 79, other suitable bonding agents or materials may be utilized. The interior trim member 69 engages a trim receiving portion 78 of the glazing clip 77 at one end and is secured to the body structure 59 at the other end. The trim receiving portion 78 of the clip 77 is a longitudinal groove defined by the clip 77, although other suitable arrangements may be utilized. The glazing clip 77 may also include a gasket (not shown) that engages a sacrificial liner 81. The glazing clip 77 has a generally U-shaped portion that receives the lips 73, 75 and an adjacent inverted U-shaped portion that receives the sacrificial liner 81.

Referring to FIG. 4B, the mounting clip 63 includes a body 80 having an extension 82 that extends outwardly from the body 80 in a direction generally perpendicular to a plane defined by the body 80. The body 80 of the mounting clip 63 defines an opening 83 for receiving the fastener 65 that secures the clip 63 to the body portion 59 and the extension 82 defines an opening 84 for receiving the fastener 67 that secures the clip 63 to the frame member 57. The opening 84 is generally slot-shaped to allow adjustment between the frame member 57 and the clip 63. The window system 55 described above may include a plurality of mounting clips 63 positioned along the window frame 64 for receiving the frame member 57 that extends longitudinally along the length of the window frame 64.

Figures 5A, 5B:
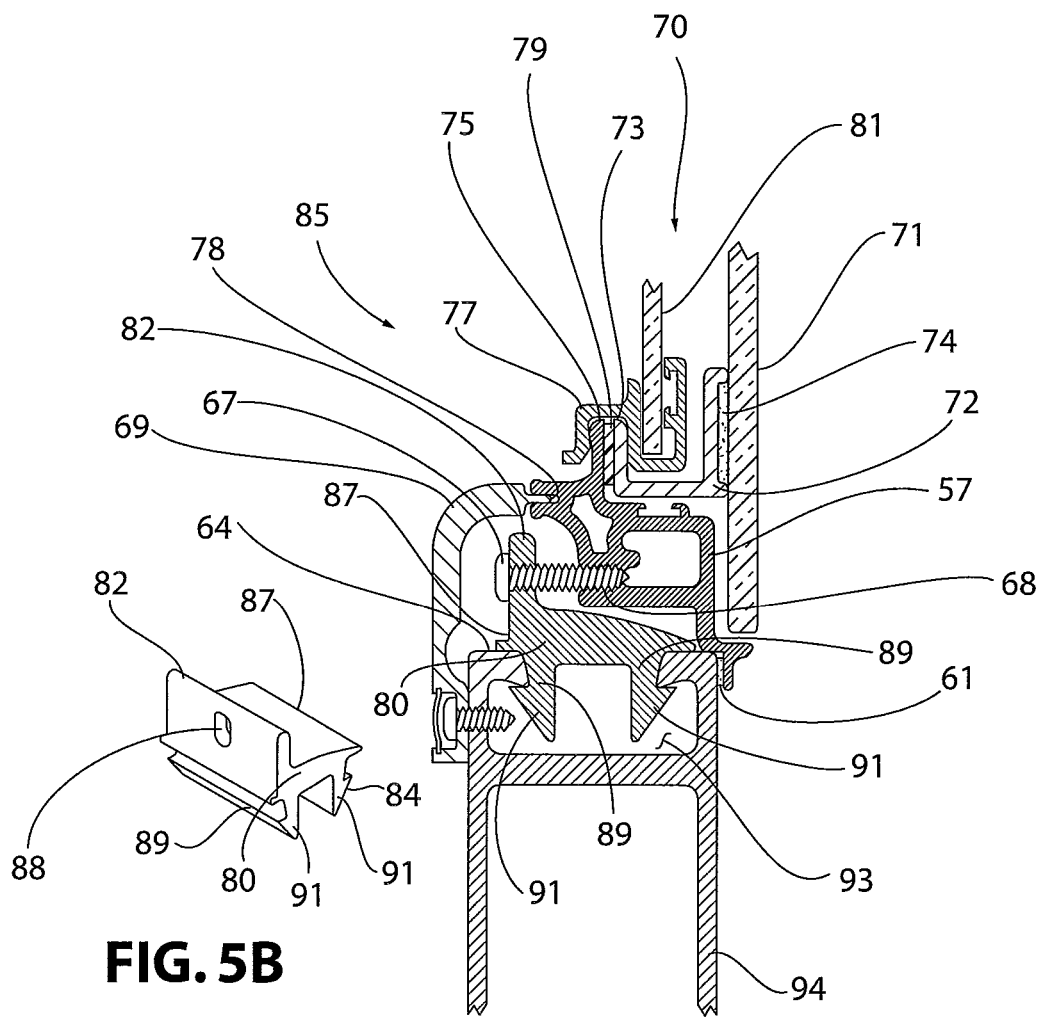
FIG. 5A is a cross-sectional view of a vehicle window system according to another embodiment of the present invention.
FIG. 5B is a perspective view of a mounting clip of the window system shown in FIG. 5A.

Referring to FIGS. 5A and 5B, yet another embodiment of a window system 85 is shown, which is also similar to the system of FIGS. 4A and 4B. Like reference numerals are used for like elements. In the window systems 25, 55 shown in FIGS. 3A-4B, the mounting clips 33, 63 are affixed to the body structures 29, 59 using an adhesive or mechanical fastener. The window system 85 shown in FIGS. 5A and 5B includes a mounting clip 87 having a pair of legs 89 extending from a bottom surface of the body 80 of the clip 87. The legs 89 each include detents 91 and are shaped and configured to fit into a corresponding groove 93 in a body portion 94 of the vehicle thereby securing the clip 87 to the body portion 94. The clip 87 may be used with either of the window systems 25, 55 described above.

Figure 6:
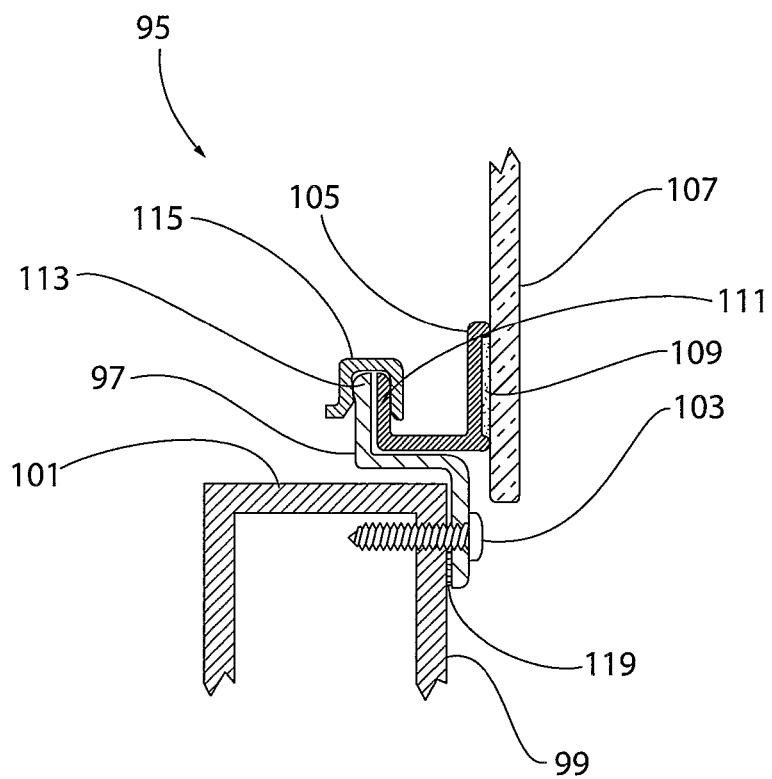
FIG. 6 is a cross-sectional view of a vehicle window system according to yet another embodiment of the present invention.

Referring to FIG. 6, yet another embodiment of a window system 95 includes a frame member 97 generally having a Z-shape that is attached to an outside surface 99 of a body portion 101 of a vehicle using mechanical fasteners 103, such as screws. The window system 95 does not utilize the mounting clips 33, 63, 87 used in connection with the window systems 25, 55, 85. As described above with respect to FIGS. 4A and 4B, a glass ring 105 is affixed to an inside surface of window glazing 107 via a commercially available adhesive 109 or any other suitable arrangement. The glass ring 105 is generally U-shaped in cross-section and includes a retaining lip 111. The glazing 107 with the glass ring 105 secured thereto is positioned adjacent the frame member 97 such that the retaining lip 111 is proximate to a retaining lip 113 on the frame member 97. The window glazing 107 is retained in the frame member 97 with a glazing clip 115 that engages the two retaining lips 111, 113 and holds the lips 111, 113 against each other. A sealant 119 is positioned between the frame member 97 and the outside surface of the body structure 101.

Figure 7:
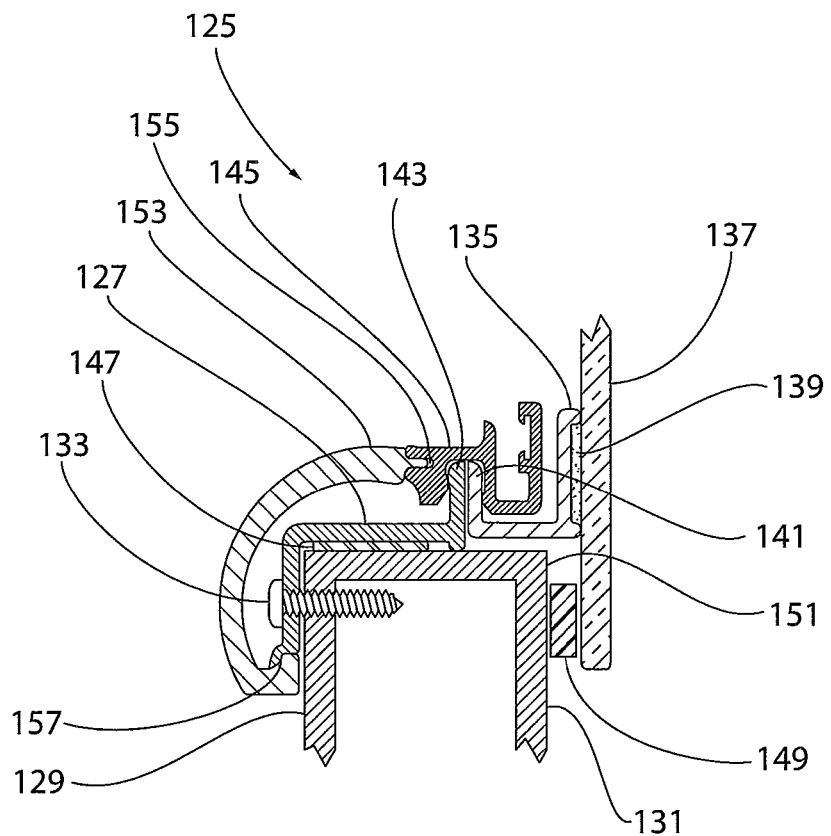
FIG. 7 is cross-sectional view of a vehicle window system according to a further alternative embodiment of the present invention.

Referring to FIG. 7, a further embodiment of a window system 125 is shown, which is similar to the system 55 of FIGS. 4A and 4B. The window system 125 shown in FIG. 7 includes a frame member 127 generally having a Z-shape that is attached to an inside surface 129 of a body portion 131 of the vehicle by a mechanical fastener 133, such as a screw, although other suitable fastening arrangements may be utilized. The window system 125 does not utilize the mounting clips 33, 63, 87 used in connection with the window systems 25, 55, 85. As described above with respect to FIGS. 4A and 4B, a glass ring 135 is affixed to an inside surface of a window glazing 137 via a commercially available adhesive 139 or any other suitable arrangement. The glass ring 135 is generally U-shaped in cross-section and includes a retaining lip 141 that is positioned proximate a retaining lip 143 on the frame member 127.

Referring again to FIG. 7, a glazing clip 145 engages the two retaining lips 141, 143 and holds the lips 141, 143 against each other. A sealant 147 is provided between the frame member 127 and the body structure 131 and a foam or sealant 149 is positioned between the window glazing 137 and an outside surface 151 of the body portion 131 of the vehicle. An interior trim member 153 covers and conceals the frame member 127 and engages a trim receiving portion 155 on the glazing clip 145 and a trim receiving portion 157 on the frame member 127. The trim receiving portion 155 is a longitudinal groove that receives a portion of the trim 153 in a similar manner as described above in connection with the window system 55 shown in FIGS. 4A and 4B. The trim receiving portion 157 of the frame member 127 is a longitudinal groove that receives a portion of the trim 153. In particular, the trim receiving portion 157 of the frame member 127 and the trim member 153 cooperate to form a hook-like engagement between the frame member 127 and the trim member 153. Although not shown, the window system 125 may also include a sacrificial liner as described above in connection with the window system 55 and shown in FIGS. 4A and 4B.

With regard to window breakage, the window systems 25, 55, 85, 95, 125 described above provide a vehicle turn-around time equal to or faster than the turn-around time for replacing a conventional rubber gasket glazing. The window systems 25, 55, 85, 95, 125, however, additionally provide an aesthetically pleasing exterior for the vehicle. With regard to interior window surface protection, the window systems 25, 55, 85, 95, 125 utilize a sacrificial liner requiring far less skill to apply than the application of the boPET polyester films described above. Thus, the window systems 25, 55, 85, 95, 125 provide an aesthetically desirable exterior finish along with ease of maintenance in the event of graffiti or vandalism to the window or the sacrificial layer.

While several embodiments of the transit window system were described in the foregoing detailed description, those skilled in the art may make modifications and alterations to these embodiments without departing from the scope of the invention. Accordingly, the foregoing description is intended to be illustrative rather than restrictive.

The invention claimed is:

1. A window system for a vehicle having a body portion that defines a window opening, the window system comprising:
    a glazing assembly;
    a frame member having a portion for receiving the glazing assembly, the frame member configured to be secured to the body portion of the vehicle; and
    a mounting clip having a body defining a planar surface configured to be positioned in the window opening and abut the body portion of the vehicle, the mounting clip including an extension that extends outwardly from the planar surface of the body of the mounting clip,
    wherein the body of the mounting clip is configured to be attached to the body portion of the vehicle, and wherein the extension of the mounting clip is configured to be attached to the frame member.

2. The window system of claim 1, wherein the portion for receiving the glazing assembly of the frame member includes a gasket seat and a clip receiving portion.

3. The window system of claim 2, wherein the glazing assembly comprises a glass retaining clip, a wedge, a sacrificial liner, window glazing, and a glazing gasket, with the glazing gasket configured to be received by the gasket seat, and the glass retaining clip configured to be received by the clip receiving portion.

4. The window system of claim 3, wherein the gasket seat and the clip receiving portion are positioned adjacent to each other, and wherein the sacrificial liner and the window glazing are configured to be positioned between the wedge and the glazing gasket.

5. The window system of claim 2, wherein the frame member includes a trim receiving portion.

6. The window system of claim 1, wherein the portion for receiving the glazing assembly of the frame member includes a retaining lip.

7. The window system of claim 6, wherein the glazing assembly comprises a glass ring, window glazing, a glazing clip, and a sacrificial liner, with the glass ring having a retaining lip, and wherein the glass ring is secured to the window glazing and the glazing clip is configured to engage the retaining lip of the frame member and the retaining lip of the glass ring.

8. The window system of claim 7, wherein the glazing clip has a portion for receiving the sacrificial liner.

9. The window system of claim 1, wherein the extension of the mounting clip defines an opening for receiving a fastener.

10. The window system of claim 1, wherein the mounting clip further includes a pair of legs extending from the body on a side opposite from the extension.

11. The window system of claim 10, wherein the pair of legs of the mounting clip includes detents configured to engage the body portion of the vehicle, and wherein the extension of the mounting clip defines a slot-shaped opening for receiving a fastener.

12. A window system for a vehicle comprising:
    a window frame defined by a body portion of a vehicle;
    a frame member positioned adjacent to the window frame and secured to the body portion of the vehicle;
    a glazing assembly secured to a portion of the frame member; and
    a mounting clip having a body defining a planar surface positioned on the window frame and an extension extending outwardly from the planar surface of the body of the mounting clip, with the body of the mounting clip secured to the window frame and with the extension of the mounting clip secured to the frame member, wherein the frame member is secured to the window frame by a bonding agent.

13. The window system of claim 12, wherein the frame member includes a gasket seat and a clip receiving portion.

14. The window system of claim 13, wherein the glazing assembly comprises a glass retaining clip, a wedge, a sacrificial liner, window glazing, and a glazing gasket, with the glazing gasket received by the gasket seat, and the glass retaining clip received by the clip receiving portion.

15. The window system of claim 14, wherein the gasket seat and the clip receiving portion are positioned adjacent to each other, and wherein the sacrificial liner and the window glazing are positioned between the wedge and the glazing gasket.

16. The window system of claim 14, further comprising a trim member having a first end secured to the frame member and a second end secured to the body portion of the vehicle, with the trim member configured to conceal the mounting clip.

17. The window system of claim 12, wherein the frame member includes a retaining lip for securing the glazing assembly.

18. The window system of claim 17, wherein the glazing assembly comprises a glass ring, window glazing, a glazing clip, and a sacrificial liner, with the glass ring having a retaining lip, and wherein the glass ring is secured to the window glazing and the glazing clip engages the retaining lip of the frame member and the retaining lip of the glass ring.

19. The window system of claim 18, wherein a bonding material is positioned between the retaining lip of the frame member and the retaining lip of the glass ring.

20. The window system of claim 18, wherein the glazing clip receives the sacrificial liner.

21. The window system of claim 18, further comprising a trim member having a first end secured to the glazing clip and a second end secured to the body portion of the vehicle, with the trim member configured to conceal the mounting clip.

22. The window system of claim 12, wherein the extension of the mounting clip defines an opening for receiving a fastener.

23. The window system of claim 22, wherein the mounting clip further includes a pair of legs extending from the body on a side opposite from the extension, with each of the legs having a detent that secures the mounting clip to a groove on the body portion of the vehicle.

24. A method of installing a window system for a vehicle comprising:
    securing a mounting clip to a window frame defined by a body portion of a vehicle;

positioning a frame member adjacent to the window frame and securing the frame member to the mounting clip and to the body portion of the vehicle, wherein the frame member is secured to the body portion of the vehicle using a bonding agent; and securing a glazing assembly to the frame member.

25. The method of claim 24, further comprising:

installing a trim member to conceal the mounting clip.

\* \* \* \* \*